US012294234B2

(12) United States Patent
Schulz et al.

(10) Patent No.: US 12,294,234 B2
(45) Date of Patent: May 6, 2025

(54) SYSTEMS AND METHODS FOR EFFICIENT DC FAST CHARGING

(71) Applicant: Rivian IP Holdings, LLC, Plymouth, MI (US)

(72) Inventors: Steven E. Schulz, Torrance, CA (US); Silva Hiti, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 693 days.

(21) Appl. No.: 17/515,811

(22) Filed: Nov. 1, 2021

(65) Prior Publication Data

US 2023/0135040 A1    May 4, 2023

(51) Int. Cl.
*H02J 7/00*    (2006.01)
*H01M 10/44*    (2006.01)
*H01M 10/613*    (2014.01)

(52) U.S. Cl.
CPC ......... *H02J 7/0071* (2020.01); *H01M 10/441* (2013.01); *H01M 10/613* (2015.04)

(58) Field of Classification Search
USPC ........................................ 320/125, 130, 133
See application file for complete search history.

(56) References Cited

U.S. PATENT DOCUMENTS

| 6,060,865 A | * | 5/2000 | Chen | ................... H02J 7/00711 320/141 |
| 2007/0188134 A1 | * | 8/2007 | Hussain | ................ H02J 7/0071 320/114 |

OTHER PUBLICATIONS

F.Badin, Evaluation of EVs energy consumption influencing factors, driving conditions, auxiliaries use, driver's aggressiveness, Nov. 17-20, 2013, 0112-0123, vol. 6, Barcelona, Spain.

* cited by examiner

*Primary Examiner* — Samuel Berhanu
(74) *Attorney, Agent, or Firm* — Foley & Lardner LLP

(57) ABSTRACT

In an illustrative embodiment, a direct current (DC) fast charger (DCFC) controller unit includes a controller. The controller includes a processor and computer-readable media. The computer-readable media is configured to store computer-executable instructions configured to cause the processor to: receive a maximum charge time duration to charge at least one battery to a desired state of charge responsive to an increased efficiency charge mode being enabled; determine an amount of energy used in a plurality of charge cycles for charging the at least one battery to the desired state of charge with charge time durations no longer than the maximum charge time duration; select a charge cycle for charging the at least one battery to the desired state of charge with a lowest amount of energy used; and cause the at least one battery to be charged with the selected charge cycle.

18 Claims, 13 Drawing Sheets

SYSTEMS AND METHODS FOR EFFICIENT DC FAST CHARGING

INTRODUCTION

The present disclosure relates to battery charging. The statements in this section merely provide background information related to the present disclosure and may not constitute prior art.

Reducing total energy consumption and waste during a charge session for a battery may be a consideration for cost or environmental reasons. Some users may want to charge a battery with total energy consumption as a consideration.

BRIEF SUMMARY

Various disclosed embodiments include illustrative direct current (DC) fast charger (DCFC) controller units, DCFC systems, and methods.

In an illustrative embodiment, a direct current (DC) fast charger (DCFC) controller unit includes a controller. The controller includes a processor and computer-readable media. The computer-readable media is configured to store computer-executable instructions configured to cause the processor to: receive a maximum charge time duration to charge at least one battery to a desired state of charge responsive to an increased efficiency charge mode being enabled; determine an amount of energy used in a plurality of charge cycles for charging the at least one battery to the desired state of charge with charge time durations no longer than the maximum charge time duration; select a charge cycle for charging the at least one battery to the desired state of charge with a lowest amount of energy used; and cause the at least one battery to be charged with the selected charge cycle.

In another illustrative embodiment, a DCFC system includes an electrical power converter configured to convert alternating current (AC) electrical power to DC electrical power. The electrical power converter includes a controller including a processor and computer-readable media. The computer-readable media is configured to store computer-executable instructions configured to cause the processor to: receive a maximum charge time duration to charge at least one battery to a desired state of charge responsive to an increased efficiency charge mode being enabled; determine an amount of energy used in a plurality of charge cycles for charging the at least one battery to the desired state of charge with charge time durations no longer than the maximum charge time duration; select a charge cycle for charging the at least one battery to the desired state of charge with a lowest amount of energy used; and cause the at least one battery to be charged with the selected charge cycle. At least one electrical power dispenser assembly is electrically couplable to the electrical power converter and configured to dispense DC electrical power to at least one battery.

In another illustrative embodiment, a method includes: receiving a maximum charge time duration to charge at least one battery to a desired state of charge responsive to an increased efficiency charge mode being enabled; determining an amount of energy used in a plurality of charge cycles for charging the at least one battery to the desired state of charge with charge time durations no longer than the maximum charge time duration; selecting a charge cycle for charging the at least one battery to the desired state of charge with a lowest amount of energy used; and causing the at least one battery to be charged with the selected charge cycle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
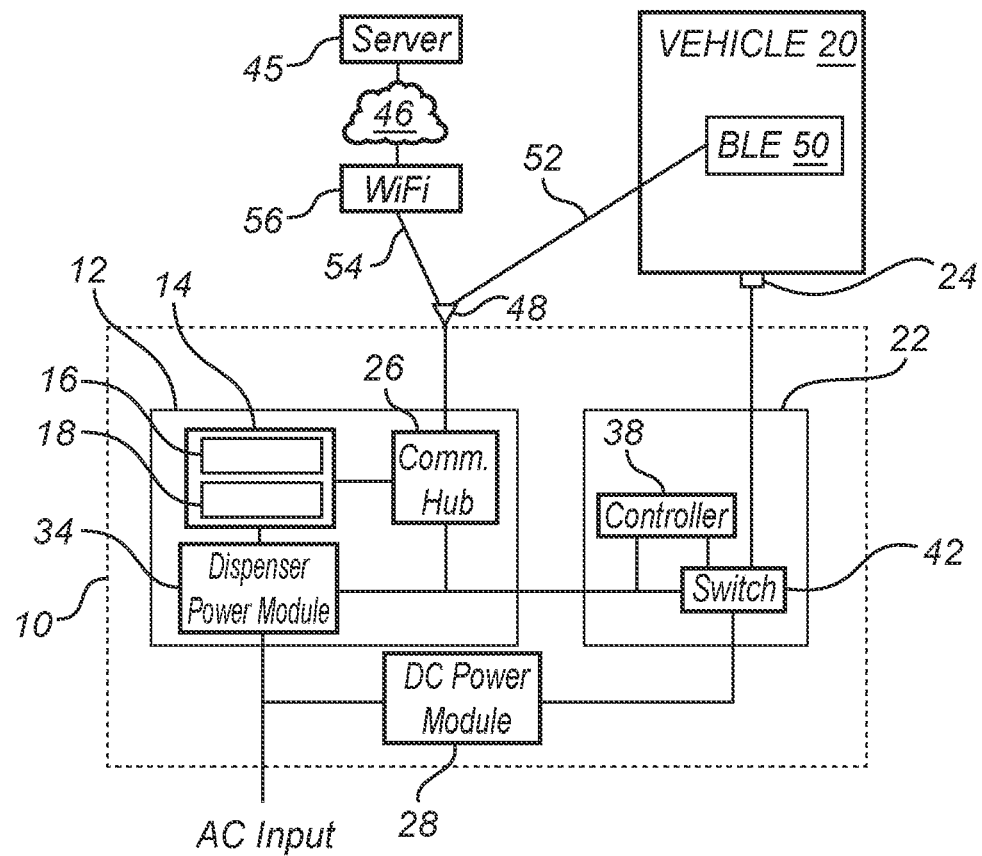
FIG. 1 is a block diagram of an illustrative DCFC system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative direct current (DC) fast charger (DCFC) controller units, DCFC systems, and methods.

By way of nonlimiting overview and referring to FIG. 1, in various embodiments an illustrative DCFC system 10 includes an electrical power converter 12 configured to convert alternating current (AC) electrical power to DC electrical power. The electrical power converter 12 includes a controller 14 including a processor 16 and computer-readable media 18. The computer-readable media 18 is configured to store computer-executable instructions configured to cause the processor 16 to: receive a maximum charge time duration to charge at least one battery 57 (FIG. 4), such as without limitation in an electric vehicle 20, to a desired state of charge responsive to an increased efficiency charge mode being enabled; determine an amount of energy used in a plurality of charge cycles for charging the at least one battery 57 to the desired state of charge with charge time durations no longer than the maximum charge time duration; select a charge cycle for charging the at least one battery 57 to the desired state of charge with a lowest amount of energy used; and cause the at least one battery 57 to be charged with the selected charge cycle. At least one electrical power dispenser assembly 22 is electrically couplable to the electrical power converter 12 and configured to dispense DC electrical power to at least one battery 57.

Still by way nonlimiting overview, it will be appreciated that, according to time available for charging the at least one battery 57, various embodiments can charge the at least one battery 57 to full charge using an amount of energy that is less than the amount of energy that would have been used by charging at peak charge current. Thus, it will be appreciated that various embodiments can take advantage of situations in which time available for charging the at least one battery 57 to full charge may be longer than that using a peak charge current capability of the DCFC system 10—thereby helping to avoid wasting energy by completing a charge sooner than is necessary.

Still by way of nonlimiting overview, although various embodiments are described herein in terms of an electric vehicle, vehicle load, state of charge, losses, and the like, it will be appreciated that various embodiments can apply to any battery, such as for example and without imitation, any residential or commercial electrical energy storage systems with a battery or with one or more banks of batteries and are not limited to electric vehicles.

Illustrative details of the DCFC system 10 and the electric vehicle 20 will be explained first by way of nonlimiting examples given by way of illustration only and not of limitation. Illustrative details regarding charging the at least one electric vehicle 20 to full charge using an amount of energy that is less than the amount of energy that would have been used at maximum charging power will be explained next by way of illustration only and not of limitation. It is again emphasized that a rechargeable battery load is given by way of illustration and not of limitation as the electric vehicle 20 and that disclosed subject matter encompasses any battery, such as for example and without imitation, any residential or commercial electrical energy storage systems with a battery or with one or more banks of batteries.

Still referring to FIG. 1, in various embodiments the DCFC system 10 includes Electric Vehicle Supply Equipment (EVSE)—a standard used for vehicle charging equipment. In such embodiments and as discussed above, the DCFC system includes the electrical power converter 12 (sometimes referred to as a power cabinet) that receives alternating current (AC) electrical power from the grid and converts the grid AC electrical power to DC electrical power. The electrical power converter 12 provides the DC electrical power to the at least one electrical power dispenser assembly 22. Each electrical power dispenser assembly 22 includes a charge coupler 24 that is electrically connected to the electrical power dispenser assembly 22 and that is electrically connectable to the battery 57 to dispense DC electrical power to the battery 57.

Figure 2A:
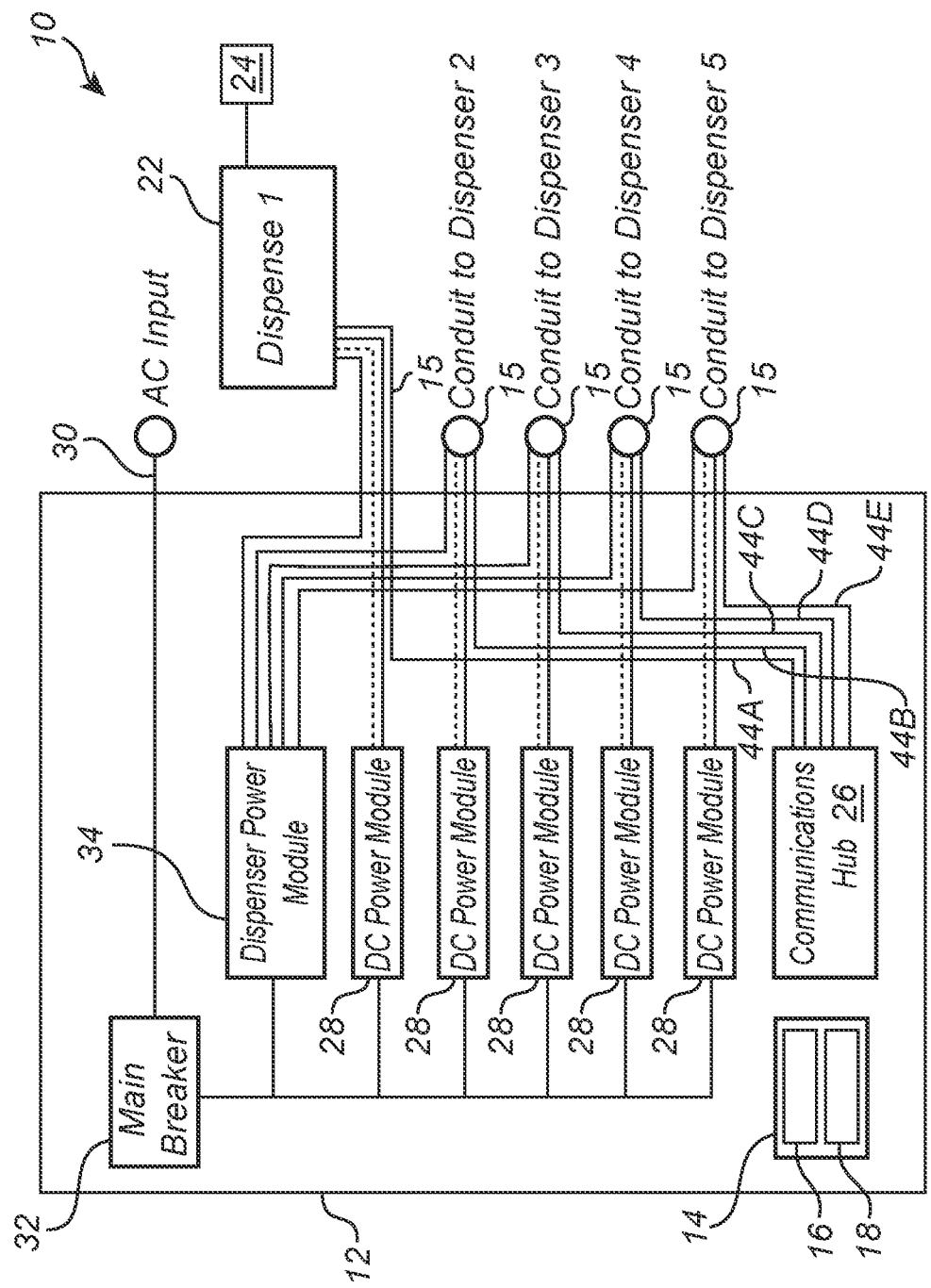
FIG. 2A is a block diagram of an illustrative electrical power converter of the DCFC system of FIG. 1.

Referring additionally to FIG. 2A, in various embodiments the processor 16 may include a computer processing unit (CPU), a general purpose processor, a digital signal processor, a field programmable gate array, or the like, and/or any combination thereof. Processors are well known and further description of their construction and operation are not necessary for an understanding by a person of skill in the art of disclosed subject matter.

In various embodiments the computer-readable media 18 may include any suitable computer memory configured to store computer-executable instructions configured to cause the processor 16 to perform functions described herein. Given by way of non-limiting examples, the computer-readable media 18 may include any suitable volatile memory elements, such as without limitation random access memory (RAM), such as dynamic RAM (DRAM), static RAM (SRAM), static-dynamic RAM (SDRAM), and the like, nonvolatile memory elements such as without limitation read-only-memory (ROM), hard drive, tape, compact-disc ROM (CDROM), and the like, and combinations thereof. Moreover, the computer-readable media 18 may incorporate electronic, magnetic, optical, and/or other types of storage media as desired.

In various embodiments the electrical power converter 12 includes the controller 14 that is coupled to a communications hub 26. In various embodiments the communications hub 26 may be configured to provide a controller 38 of the electrical power dispenser assembly 22 with signals from the controller 14. The communications hub 26 may also be configured with a communications network connection which may be wired or wireless. Each of the electrical power dispenser assemblies 22 may be individually addressed by the communications hub 26.

At least one DC power module 28 converts AC electrical power (from an AC electrical power input 30 which passes through a main breaker 32 before being sent to the DC power modules 28) to DC electrical power and a dispenser power module 34 (which provides working power to various electronics in the at least one electrical power dispenser assembly 22).

In various embodiments, the electrical power converter 12 may include up to five (5) or more DC power modules 28 as desired. However, it will be appreciated that each electrical power converter 12 may include any number of DC power modules 28 as desired for a particular application. In various embodiments, an output conduit 15 electrically connects each DC power module 28 to an associated electrical power dispenser assembly 22 that is configured to provide electrical power to an associated battery 57. It will be appreciated that, in such embodiments, only one DC power module 28 is connectable to any one vehicle 20 at a time.

In various embodiments the controller 14 is configured to control the power output of each of the DC power modules 28. In various embodiments, the electrical power converter 12 may use isolated power modules 28 that combine to achieve peak power outputs in excess of 300 kW. In such embodiments, the electrical power converter 12 has the capability to charge over 20 vehicles in an overnight dwell scenario.

Figure 2B:
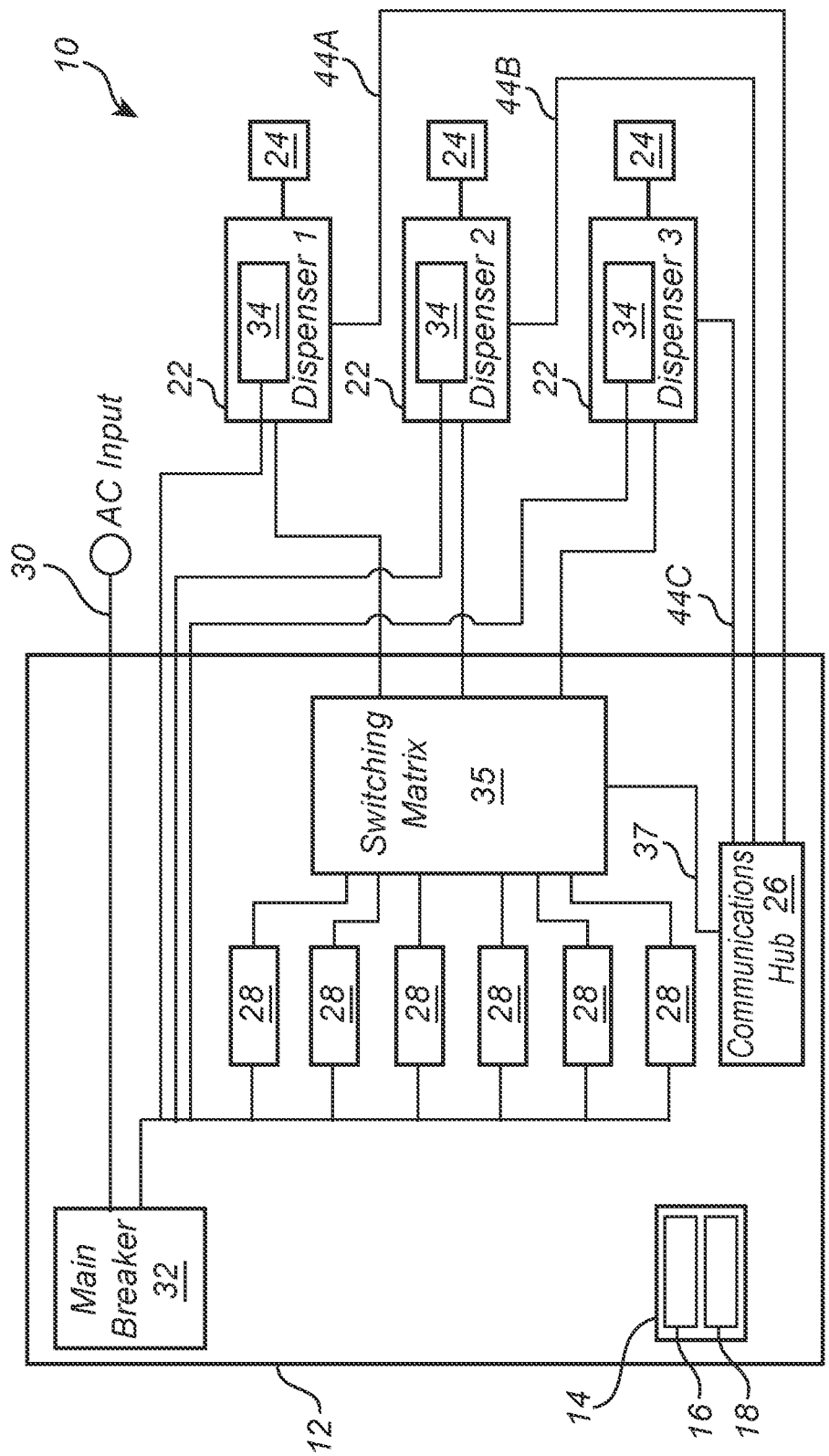
FIG. 2B is a block diagram of another illustrative electrical power converter of the DCFC system of FIG. 1.

Referring additionally to FIG. 2B, in various embodiments the DCFC system 10 is configured to electrically connect multiple DC power modules 28 in parallel to a single vehicle 20 to help permit the vehicle 20 to be charged at higher power. As shown in FIG. 2B, in such embodiments the DCFC system 10 includes the electrical power converter 12 and at least one electrical power dispenser assembly 22, each of which includes a charge coupler 24. As shown in FIG. 2B, in some embodiments each electrical power dispenser assembly 22 may include its own dispenser power module 34 that is configured to convert AC electrical power to low voltage DC electrical power. The electrical power converter 12 includes the main breaker 32, the controller 14, the processor 16, the computer-readable media 18, the communications hub 26, and the DC power modules 28, all as described above. If desired, in some other embodiments the electrical power converter 12 may include the dispenser power module 34 (instead of each electrical power dispenser assembly 22 including its own dispenser power module 34).

In such embodiments the DCFC system 10 includes any number of the DC power modules 28 and the electrical power dispenser assemblies 22 as desired. For example and given by way of illustration only and not of limitation, as shown in FIG. 2A the DCFC system 10 may include six DC power modules 28 and three electrical power dispenser assemblies 22. However, it is emphasized that the DCFC system 10 can include any number whatsoever of the DC power modules 28 and the electrical power dispenser assemblies 22 as desired for a particular application. No limitation to any number of the DC power modules 28 and the electrical power dispenser assemblies 22 is intended and no limitation to any number of the DC power modules 28 and the electrical power dispenser assemblies 22 is to be inferred.

In such embodiments, the electrical power converter 12 includes a switching matrix 35. The switching matrix 35 is electrically interposed between the DC power modules 28 and the electrical power dispenser assemblies 22. In some embodiments the switching matrix 35 may be coupled to receive a control signal 37 from the controller 14 (such as, for example, via the communications hub 26) to control connection of various DC power converters 28 to various electrical power dispenser assemblies 22. In some other embodiments, the DC power modules 28 may control the switching matrix 35. Regardless of method of controlling the switch matrix 35, in various embodiments, any number of the DC power modules 28 (from one of the DC power modules 28 to all of the DC power modules 28) can be electrically connected to any of the electrical power dispenser assemblies 22. In various such embodiments, the switching matrix 35 suitably may include any suitable switches that are controllable (by the controller 14) to connect the selected DC power converter(s) 28 to a selected electrical power dispenser assembly 22. In some embodiments the switching matrix 35 may include separate single pole switches for positive terminals and separate single pole switches for negative terminals. In some other embodiments, if desired the switching matrix 35 may include double-pole, single-throw (DPST) switches for positive and negative terminals.

In such embodiments, any number of the DC power modules 28 as desired can be electrically connected in parallel to any one of the electrical power dispenser assemblies 22 by the switching matrix 35. It will be appreciated that any number of the DC power modules 28 as desired can be selected to be electrically connected to the selected electrical power dispenser assembly 22 by the switching matrix 35. In some instances there may be an upper limit to the number of DC power modules 28 that are available (that is, that are free for use and that can be used to charge the vehicle 20 via the selected electrical power dispenser assembly 22). It will be appreciated that the available DC power modules 28 may be enabled or disabled as desired for achieving a desired charging efficiency.

Figure 2C:
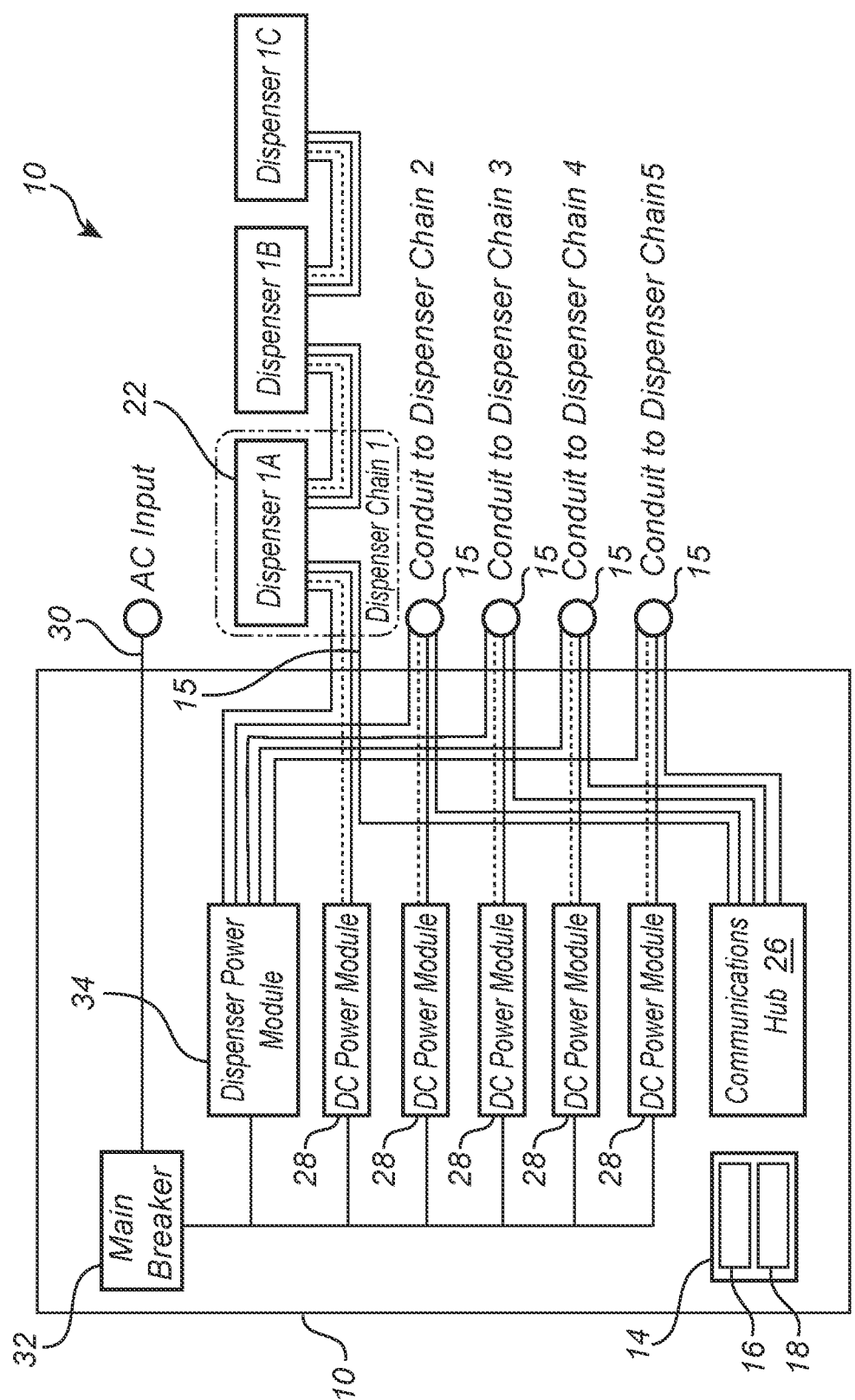
FIG. 2C is a block diagram of another illustrative power converter and another illustrative electrical power dispenser assembly.

Referring additionally to FIG. 2C and given by way of other non-limiting example, in various other embodiments the DCFC system 10 may include more than one electrical power dispenser assembly 22 electrically connected in series. That is, as shown in FIG. 2C, the electrical power dispenser assemblies 22 may be "daisy-chained" in serial electrical connection. Thus, in various embodiments, the at least one electrical power dispenser assembly 22 may include more than one electrical power dispenser assembly 22 and the at least one battery 57 may include more than one battery 57. Given by way of non-limiting example and as shown in FIG. 2C, in various embodiments the DCFC system 10 may include more than one electrical power dispenser assembly 22 electrically connected in series. As such, in a fleet application, the DCFC system 10 has the capability to chain several electrical power dispenser assemblies 22 in series fashion. For example, in such embodiments the DCFC system 10 can perform a similar calculation for the entire chain of electric vehicles 20. As such, it will be appreciated that all of the vehicles 20 may be fully charged within the allocated charge time while consuming a reduced amount of energy.

Figure 3:
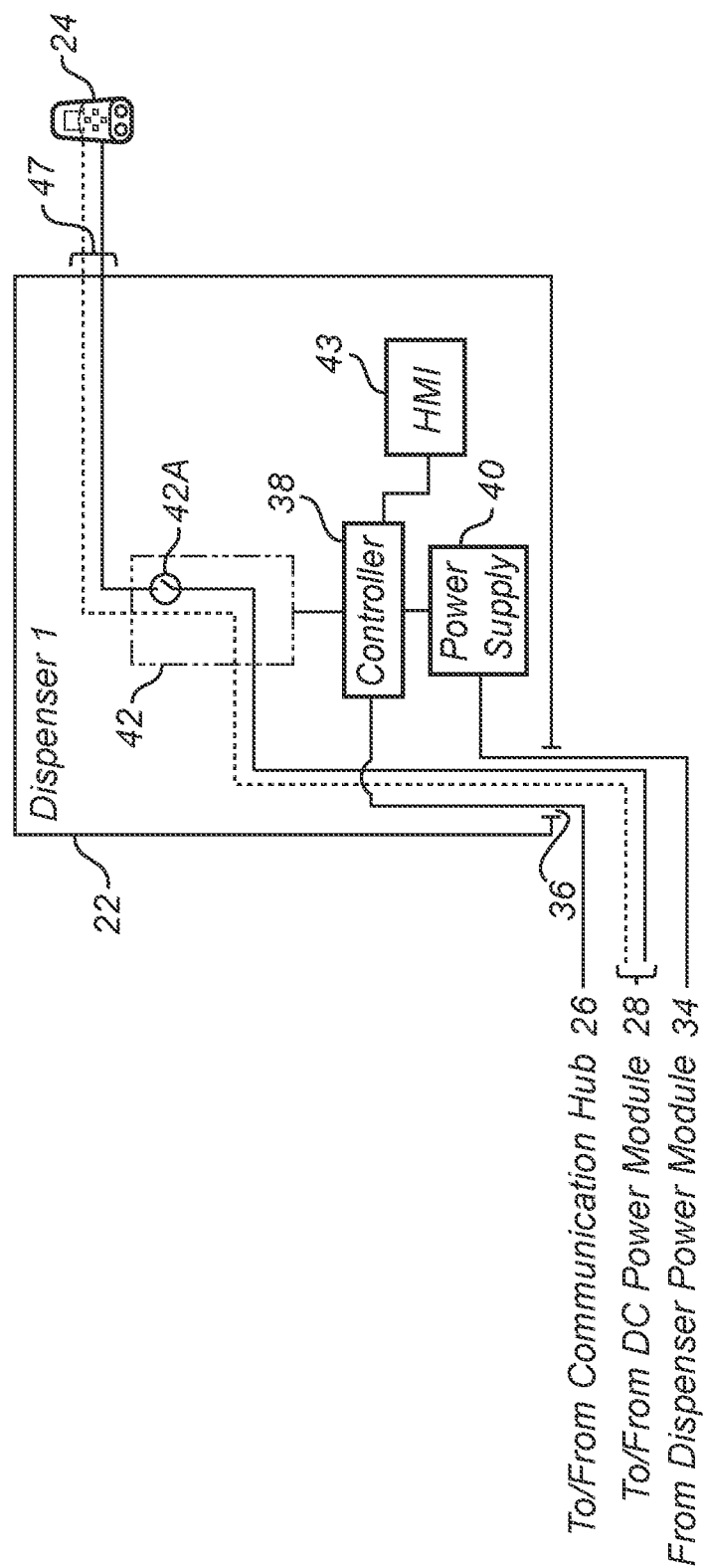
FIG. 3 is a block diagram of an illustrative electrical power dispenser assembly of the DCFC system of FIG. 1.

Referring additionally to FIG. 3, in various embodiments the electrical power dispenser assembly 22 includes a conduit input 36, a controller 38, a power supply 40, the charge coupler 24, and a switching unit 42. In various embodiments, a human-machine interface (HMI) 43 (such as, without limitation, a touch screen display or the like) is coupled to the controller 38. The switching unit 42 includes a switch 42A. The switching unit 42 may be controlled by the controller 38. The controller 38 and the switching unit 42 are configured to control the provision of electrical power to the charge coupler 24 via the switch 42A. In such embodiments the switch 42A may include any suitable switch as desired. For example, in some embodiments the switch 42A may include a double-pole, single throw (DPST) switch for positive and negative terminals. As another example, the switch 42A may be implemented as separate single pole switches (that is, a separate single pole switch for positive terminals and a separate single pole switch for negative terminals). In various embodiments the charge coupler 24 suitably may include a combined charging system (CCS) Type 1 and/or Type 2 coupler, a CHAdeMo coupler, a GB/T coupler, a Tesla connector, and/or the like.

In various embodiments the controller 14 may be configured to generate control signals 44A, 44B, 44C, 44D, and 44E (FIG. 2) for the controller 38 of associated dispensers 16 and thereby control the power output to each of the dispensers 16. Again, while five control signals are illustrated in this non-limiting example, it will be appreciated that any number of dispensers 16 and associated control signals may be used as desired for a particular application. The communications hub 26 may be configured to provide the controllers 38 with the control signals 44A, 44B, 44C, 44D, and 44E from the controller 14.

In various embodiments the charge coupler 24 is electrically connected to the electrical power dispenser assembly 22 via a cable 47. It will be appreciated that in various embodiments the cable 47 is a cable bundle that includes wiring that provides control signals to and from the charge coupler 24 and cabling that provides DC electrical power to the charge coupler 24.

The communications hub 26 may also be configured with a communications network connection (FIG. 1) which may be wired or wireless. Each of the electrical power dispenser assemblies 22 may be individually addressed by the communications hub 26. Each of the electrical power dispenser assemblies 22 may also have dispenser identifiers associated therewith to facilitate communications (such as, without limitation, information regarding time available for charging the at least one battery 57) between the controller 38 (FIG. 2) and the communications hub 26.

In various embodiments and as shown in FIG. 1, the communications hub 26 may be connected to and communicate with at least one server 45 via a communications network 46 such as but not limited to the Internet. In various embodiments the communications hub 26 may include a radio transceiver (not shown) and a radio frequency antenna 48 that is electrically connected to the radio transceiver. The radio transceiver may be configured to send and receive via various communication protocols including but not limited to Wi-Fi, Bluetooth, Bluetooth Low Energy (BLE), and the like. In some embodiments, the vehicle 20 may include a BLE transceiver 50 configured to communicate a vehicle identifier and any other information (such as, without limitation, identification of owner of a vehicle or identification of a user who is performing the charging operation) with the communications hub 26 via a BLE link 52. Further, the communications hub 26 may also communicate over a Wi-Fi link 54 with a Wi-Fi access point 56 that, in turn, communicates with one or more computer processors or one or more of the computer servers 45 over the communications network 46.

Figure 4:
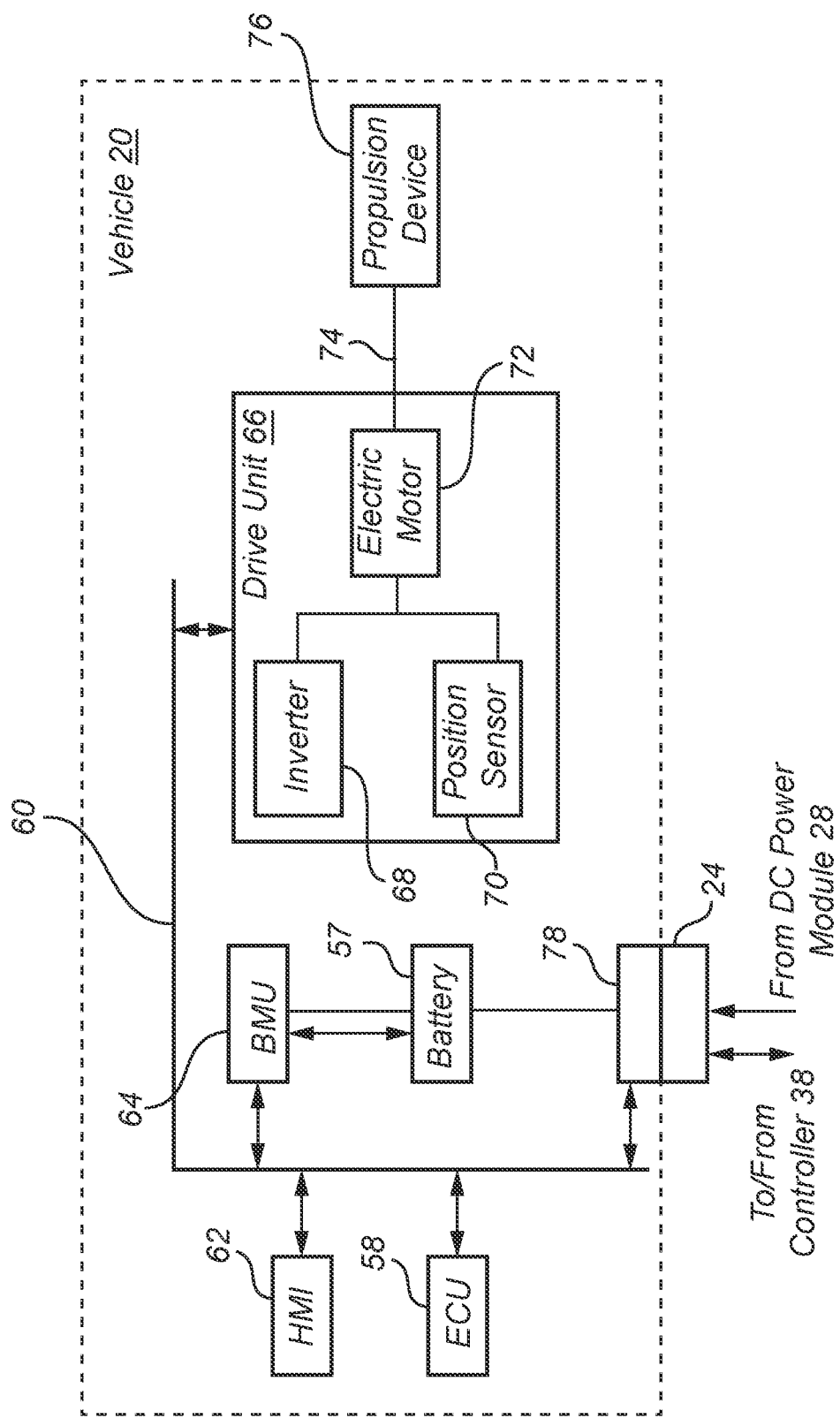
FIG. 4 is a block diagram of an illustrative electric vehicle.

Referring additionally to FIG. 4, in various embodiments the at least one electric vehicle 20 includes a battery 57. In various embodiments the battery 57 includes a high-voltage DC electrical battery. In such embodiments, the battery 57 is configured to provide high-voltage DC electrical power, such as on the order of around 450 volts or so. In various embodiments the battery 57 may include a lithium-ion battery. However, it will be appreciated that the battery 57 may include any suitable battery as desired and that further description of the battery 57 is not necessary for a person of skill in the art to understand disclosed subject matter.

It is again emphasized that the rechargeable load is given by way of illustration and not of limitation as the electric vehicle 20 and that disclosed subject matter encompasses any battery, such as for example and without imitation, any residential or commercial electrical energy storage systems with a battery or with one or more banks of batteries.

In various embodiments the at least one electric vehicle 20 includes an electronics control unit (ECU) 58 that controls operations of various components via a peer-to-peer network bus 60 such as a controller area network (CAN) bus. Other peer-to-peer network buses, such as a local area network (LAN), a wide area network (WAN), or a value-added network (VAN), may also be used for enabling communication between the ECU 58 and the components connected to the peer-to-peer network bus 60. In various embodiments the ECU 58 communicates via the peer-to-peer network bus 60 with a human-machine interface (HMI) 62, a battery management unit (BMU) 64, and one or more drive units 66.

In various embodiments and given by way of example only and not of limitation, the HMI 62 may include mechanical buttons or switches or may include selectable graphical user interface features presented on a vehicle display device(s).

In various embodiments and given by way of example only and not of limitation, the BMU 64 communicates with the battery 57 to generate battery status information, which is sent to the ECU 58 via the peer-to-peer network bus 60.

The BMU 64 receives battery information from the battery 57 and/or from any sensors (not shown for purposes of clarity) associated with or included in the battery 57. The battery information may include state of charge (SOC), temperature, voltage of battery cells, input/output current, coolant flow, or other values related to battery operations. The BMU 64 uses the battery information to control battery recharging and battery thermal management and to communicate with other components of the vehicle 20 via the peer-to-peer network bus 60 or with external components, such as without limitation the DCFC system 10 or other systems or devices.

In various embodiments the drive unit 66 may include one or more inverters 68, one or more position sensors 70 such as a resolver, and one or more electric motors 72, such as without limitation brushless direct current (BLDC) motors, alternating current induction motors (ACIM), permanent magnet (PM) synchronous motors (PMSM), interior PM motors (IPMM), PM switch reluctance motors (PMSRM), or any suitable electrical motors whatsoever as desired. A drive member 74 is rotatably coupled to the electric motor 72. At least one propulsion device 76 is coupled to the drive member 74.

In various embodiments the ECU 58 may include a data processor and computer-readable media configured to store computer-executable instructions configured to cause the data processor to perform various functions. For example, in various embodiments the computer-executable instructions are configured to cause the data processor to generate vehicle status information from data received from the HMI 62, the BMU 64, the drive unit 66, or other devices and to provide the vehicle status information via the charge coupler 24 and/or the BLE transceiver 50.

In response to the generation of the vehicle status information, the computer-executable instructions are configured to cause the data processor of the ECU 58 to generate control signals for the various other vehicle components, such as the BMU 64, the drive unit 66, or the like to perform various functions. In various embodiments, control signals for controlling the drive unit(s) 66 may, in turn, be executed by a controller (not shown) within the drive unit 66 and having a processor directly connected to the inverter(s) 68 and the position sensor(s) 70. In such embodiments, the controller included within the drive unit 66 may include computer-readable media configured to store computer-executable instructions configured to cause the processor included within the drive unit 66 to perform some or all of the functions described herein. The controller included within the drive unit 66 may communicate with the ECU 58 and other components via the peer-to-peer network bus 60.

In various embodiments and given by way of example only and not of limitation, the vehicle 20 includes a DC fast charging connector 78. In such embodiments the DC fast charging connector 78 may apply DC electrical power from an external DC fast charging unit (such as, for example, the DCFC system 10) via the charge coupler 24 to the battery 57 in response to communication with the BMU 64 and may apply applicable control signals via the charge coupler 24 to various components connected to the peer-to-peer network bus 60.

It will be appreciated that the vehicle 20 can be any type of vehicle whatsoever as desired without limitation. Given by way of non-limiting example, in various embodiments the vehicle 20 may be an electric vehicle (that is, an all-electrically driven vehicle) or a hybrid vehicle. For example and given by way of non-limiting examples, in various embodiments the vehicle 20 may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 20 may include a marine vessel such as, without limitation, a boat, a ship, a submarine, a submersible, an autonomous underwater vehicle (AUV), and the like. Given by way of further non-limiting examples, in various embodiments the vehicle 20 may include an aircraft such as, without limitation, a fixed wing aircraft, a rotary wing aircraft, and a lighter-than-air (LTA) craft.

In various embodiments the electric motor (or motors) 72 is configured to drive the vehicle 20. That is, in various embodiments the electric motor (or motors) 72 may drive any drive member 74 that drives any propulsion device 76, such as without limitation a wheel or wheels, a track or tracks, a propellor or propellors, a propulsor or propulsors, a rotor or rotors, or the like, associated with the vehicle 20.

For example, in some embodiments in a motor vehicle one electric motor 72 may be configured to drive one drive member 74 such as an axle or a chain ring that drives one wheel or track, in some other embodiments in a motor vehicle one electric motor 72 may be configured to drive an axle that rotates two wheels or two tracks, and in some other embodiments in a motor vehicle one electric motor 72 may be configured to drive an axle that rotates one wheel or one track and another motor configured to drive another axle that rotates another wheel or another track.

Similarly, in some embodiments in a marine vessel one electric motor 72 may be configured to drive one propeller or propulsor, in some other embodiments in a marine vessel one electric motor 72 may be configured to drive a shaft that rotates two propellers or two propulsors, and in some other embodiments in a marine vessel one electric motor 72 may be configured to drive a shaft that rotates one propeller or propulsor and another electric motor 72 may be configured to drive another shaft that rotates another propeller or propulsor.

Likewise, in some embodiments in an aircraft one electric motor 72 may be configured to drive one propeller or rotor, in some other embodiments in an aircraft one electric motor 72 may be configured to drive a shaft that rotates two propellers or two rotors, and in some other embodiments in an aircraft one electric motor 72 may be configured to drive a shaft that rotates one propeller or rotor and another electric motor 72 may be configured to drive another shaft that rotates another propeller or rotor.

Now that illustrative, non-limiting embodiments of the DCFC system 10 and the electric vehicle 20 have been explained by way of nonlimiting examples given by way of illustration only and not of limitation, illustrative details regarding charging the at least one battery 57 to full charge using an amount of energy that is less than the amount of energy that would have been used at maximum charging power will be explained next by way of illustration only and not of limitation.

Figure 5:
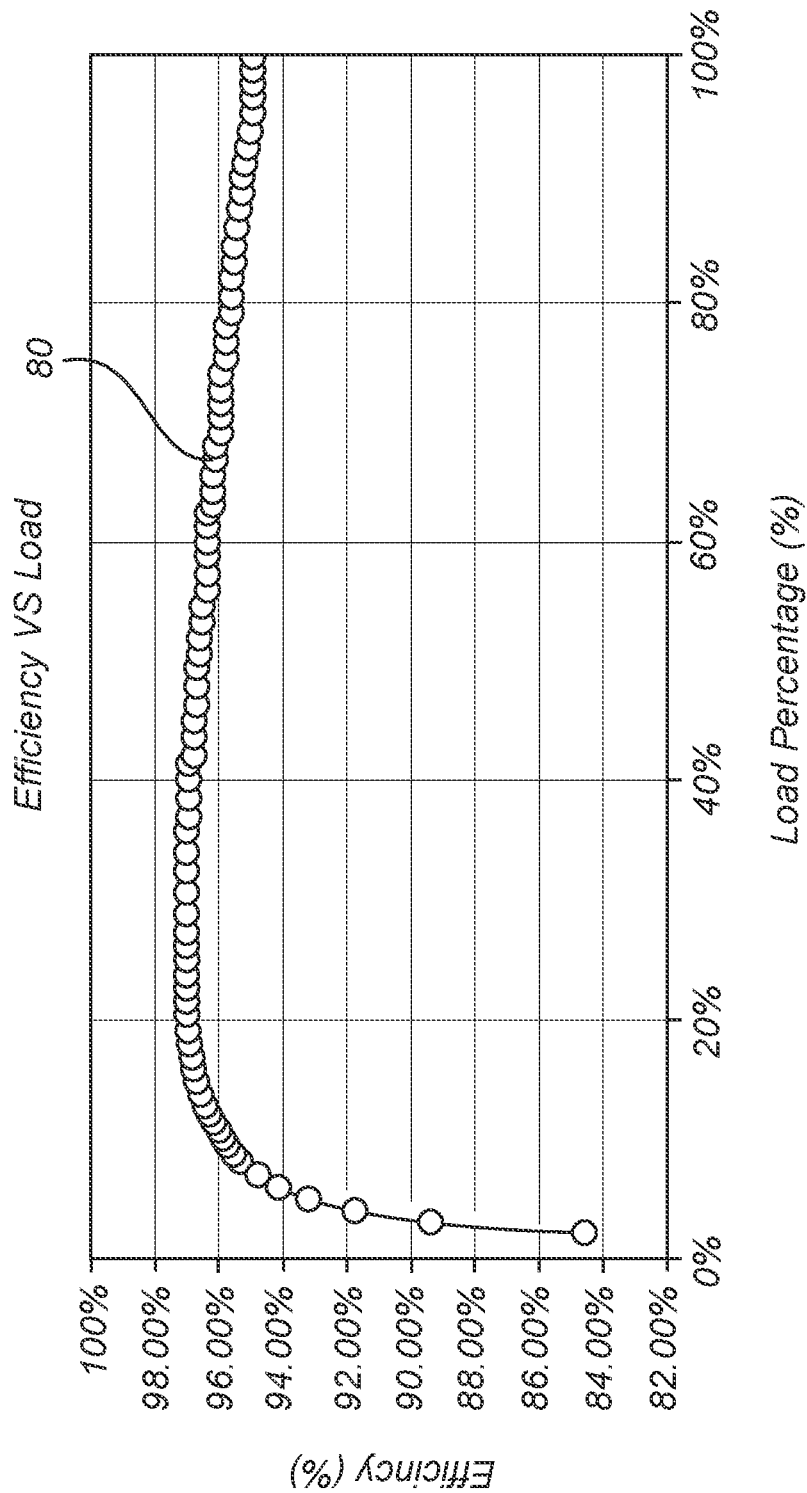
FIG. 5 is a graph of charger efficiency versus charger load.

Referring additionally to FIG. 5, an example curve 80 plots efficiency of the DCFC system 10 along a y axis versus load (that is, charge power) of the DCFC system 10. As shown in FIG. 5, efficiency of the DCFC system 10 rapidly increases to around ninety-six percent as load percentage increases up to around ten percent or so. As shown in FIG. 5, efficiency of the DCFC system 10 levels off at a maximum efficiency of around ninety-seven percent or so at a load percentage of around twenty-five percent to thirty percent and gradually decreases in a substantially linear manner to an efficiency of ninety-five percent or so at one hundred percent load (that is, peak charge current). Thus, it will be appreciated that the DCFC system 10 is not operating at maximum efficiency at peak charging current. Instead, it will be appreciated that the DCFC system 10 is operating at maximum efficiency at a load percentage of around twenty-five percent to thirty percent (that is, at a charge current of around twenty-five percent to thirty percent of peak charge current). As shown in FIG. 5, the DCFC system 10 is about two percent less efficient at peak charge current that at a charge current of around twenty-five percent to thirty percent of peak charge current. Thus, in various embodiments the DCFC system 10 can charge the at least one battery 57 at a charge current less than peak charge current when sufficient time is available. As a result, in various embodiments the DCFC system 10 can charge the at least one battery 57 at a higher efficiency than that at peak charge current. Thus, in various embodiments the DCFC system 10 can use less electrical power to charge the at least one battery 57 than would be used to charge the at least one battery 57 using peak charge current.

Still referring to FIGS. 1, 2A, 2B, and 3-5 and in view of gains in efficiency of the DCFC system 10 at charge current less than peak charge current, various embodiments can operate as follows.

In various embodiments, a user can enable or disable an increased efficiency charge mode. In such embodiments, an increased efficiency charge mode is a charge mode that charges the battery 57 to a desired state-of-charge (SOC) with charge current less than peak charge current in a time longer than time to charge the battery 57 to the desired SOC using peak charge current.

At commencement of a charging operation, in various embodiments the instructions may cause the processor 16 to cause the controller 38 to cause a user to be prompted to enter a desired SOC. For example, in some embodiments the instructions may cause the processor 16 to cause the controller 38 to cause the HMI 43 of the electrical power dispenser assembly 22 to prompt a user to enter a desired SOC. In some other embodiments the instructions may cause the processor 16 to cause (via the electrical power dispenser assembly 22, the ECU 58, and the peer-to-peer network bus 60) the HMI 62 of the electric vehicle 20 to prompt a user to enter a desired SOC. It will be appreciated that the desired SOC may be entered in any format as desired, such as without limitation percentage of charge for the battery 57, usable time of the battery 57, distance travelable, or the like.

In some embodiments the instructions may cause the processor 16 to cause the controller 38 to cause the HMI 43 of the electrical power dispenser assembly 22 to present to a user an option to enable an increased efficiency charge mode or to disable an increased efficiency charge mode. As another example, in some other embodiments the instructions may cause the processor 16 to cause (via the electrical power dispenser assembly 22 and the peer-to-peer network bus 60) the HMI 62 of the electric vehicle 20 to present to a user an option to enable increased efficiency charge mode or to disable increased efficiency charge mode.

In such embodiments, when an increased efficiency charge mode is disabled the instructions cause the processor 16 to cause the DCFC system 10 to charge the at least one battery 57 to the desired SOC using peak charge current—that is, at a maximum charging rate within system limits.

Further description is not necessary for a person of skill in the art to understand charging the at least one battery 57 using peak charge current.

In various embodiments, with an increased efficiency charge mode enabled, the instructions cause the processor 16 to perform functions as set forth below.

In various embodiments, when an increased efficiency charge mode is enabled, a user may be prompted to enter a maximum charge time duration. For example, in some such embodiments the instructions may cause the processor 16 to cause the controller 38 to cause the HMI 43 of the electrical power dispenser assembly 22 to prompt a user to enter a maximum charge time duration. In some other such embodiments the instructions may cause the processor 16 to cause (via the electrical power dispenser assembly 22 and the peer-to-peer network bus 60) the HMI 62 of the electric vehicle 20 to prompt a user to enter a maximum charge time duration. Regardless, in such embodiments the user enters a maximum charge time duration via the HMI 43 of the electrical power dispenser assembly 22 or the HMI 62 of the electric vehicle 20, as appropriate. Given by way of non-limiting examples, the maximum charge time duration may be entered in any suitable format, such as without limitation hours (with any number of decimal points as desired), hours and minutes, minutes, or the like, as desired.

It will be appreciated that, in some embodiments, a maximum charge time duration may be provided by an automated system (such as, without limitation, the processor 16) based upon factors such as time entailed in charging the battery 57 to the desired SOC, for example, based on a maximum charging rate within the limitations of the DCFC system 10. For example, in some embodiments the maximum charge time duration may be based on the maximum time available to charge the at least one battery 57 vehicle before a user desires to drive the electric vehicle 20 or before an automated system (such as, without limitation, the processor 16) determines that the DCFC system 10 is unavailable.

With a desired (or otherwise) SOC entered, an increased efficiency charge mode enabled, and a maximum charge time duration entered, in various embodiments the instructions may cause the processor 16 to perform further functions as set forth below.

In view of the desired SOC entered, an increased efficiency charge mode being enabled, and a maximum charge time duration entered, in various embodiments the processor 16 may determine an amount of energy used in charge cycles for charging the at least one battery 57 to the desired state of charge with charge time durations no longer than the maximum charge time duration.

In some such embodiments, the processor 16 may determine an amount of energy used in charge cycles for charging the at least one battery 57 to the desired state of charge with charge time durations no longer than the maximum charge time duration responsive to efficiency of the DCFC system 10, efficiency of the at least one battery 57, and maximum charge time duration.

For example, efficiency of the DCFC system 10 may be determined responsive to electrical power losses within the DCFC system 10—such as, without limitation, electrical power conversion losses, bias and housekeeping power usage—that is ancillary power entailed to perform charging with the DCFC system 10 such as without limitation power for contactor coils, protection devices, gate drivers, and the like, cooling pump power usage, cooling fan power usage, controller power usage, display power usage, and/or the like. As such, in various embodiments the DCFC system 10 already knows its own efficiency characteristics. Thus, these efficiency characteristics are accounted for in the efficiency calculation of the DCFC system 10. In addition, in various embodiments the processor 16 may cause a cooling pump and/or a cooling fan to operate at a reduced speed.

Figure 6:
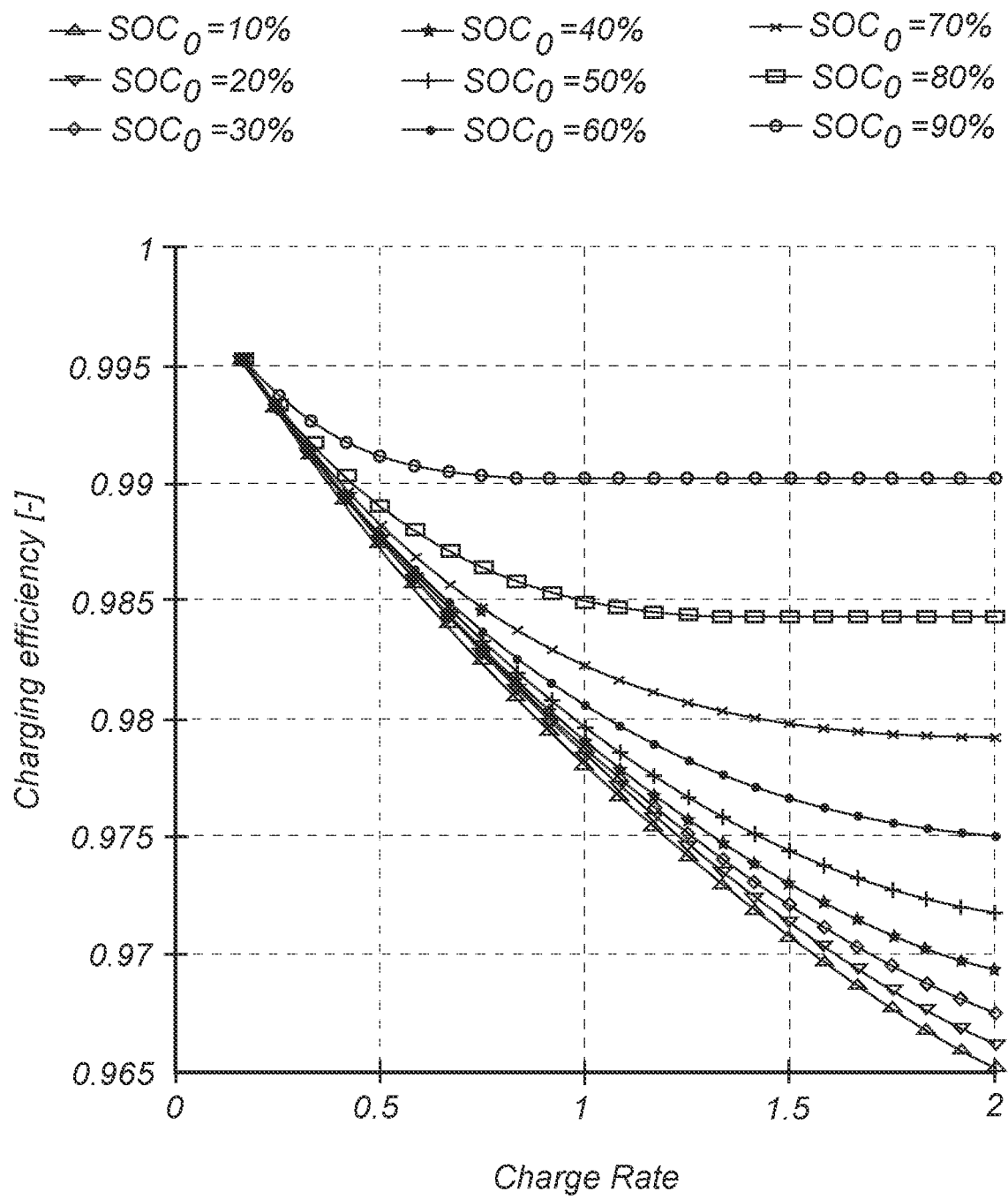
FIG. 6 is a graph of charging efficiency of an electric vehicle.

In addition, data regarding efficiency of the at least one battery 57 may be provided in a data format such as an efficiency curve and effective charge resistance. For example and referring additionally to FIG. 6, in various embodiments, the vehicle 20 may provide charge cycle efficiency data to the DCFC system 10. As shown in FIG. 6, in various embodiments an illustrative vehicle charging efficiency curve is plotted as a function of charge rate (that is, charge current divided by a battery's capacity to store an electrical charge ("C-rate")) and initial state of charge (SOC). The charge rate is shown on an x-axis and the charge cycle efficiency is plotted on a y-axis. As shown in FIG. 6, vehicle charging efficiency generally decreases as the charge rate is increased. It will be appreciated that in various embodiments the vehicle charging efficiency curve may incorporate information regarding on-vehicle parasitic loads, such as without limitation pumps and fans, which can help improve accuracy and fidelity of predicted vehicle efficiency.

In some other embodiments, the vehicle 20 may provide information in a simplified form, such as an equivalent charge resistance. In such embodiments, the DCFC system 10 can compute the vehicle side losses as the square of the charging current times the effective charging resistance.

Referring additionally to FIGS. 7A-7H, in various embodiments the processor 16 determines charge cycles that can charge the at least one battery 57 to the desired SOC within the maximum charge time duration. As discussed above, such charge cycles can entail charging at less than the maximum charge rate of the DCFC system 10 and, thus, can use less electrical power to charge the at least one vehicle 20 to the desired SOC.

As will be explained below with reference to FIGS. 7A-7H, in various embodiments the processor 16 may determine an amount of energy used in charge cycles in charging the at least one vehicle 20 to the desired SOC within the maximum charge time duration. The processor 16 may select a charge cycle for charging the at least one battery 57 to the desired state of charge with a lowest amount of energy used and may cause the at least one battery 57 to be charged with the selected charge cycle.

In some instances, the charge cycle selected for charging the at least one battery 57 to the desired state of charge with a lowest amount of energy used can include a charge cycle performed using less than a maximum charge power capability of the DCFC system 10. In such instances, the processor 16 has determined that the battery 57 can be charged to the desired state of charge within the maximum charge time duration.

In some other instances, the charge cycle selected for charging the at least one battery 57 to the desired state of charge with a lowest amount of energy used may include a charge cycle performed using the maximum charge power capability of the DCFC system 10. That is, in such instances, the processor 16 has determined that the at least one battery 57 can be charged to the desired state of charge within the maximum charge time duration only by charging with the maximum charge power capability of the DCFC system 10.

Several non-limiting scenarios will now be explained by way of non-limiting examples set forth by way of illustration only and not of limitation.

Figure 7A:
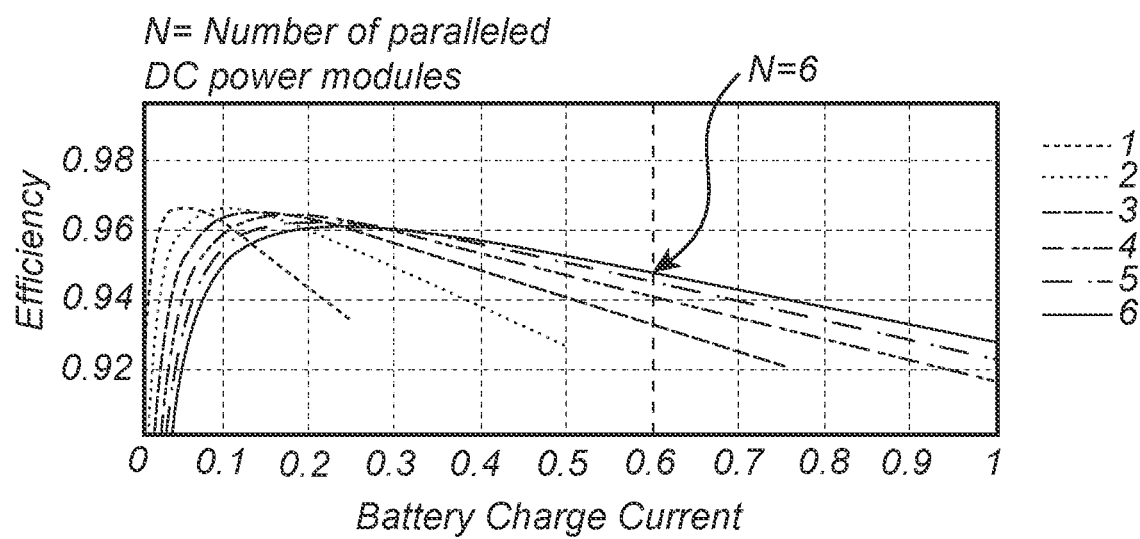
FIGS. 7A and 7B are graphs of charge efficiency versus battery charge current and time to charge versus battery charge current, respectively, for an illustrative battery charging application.
Figure 7B:
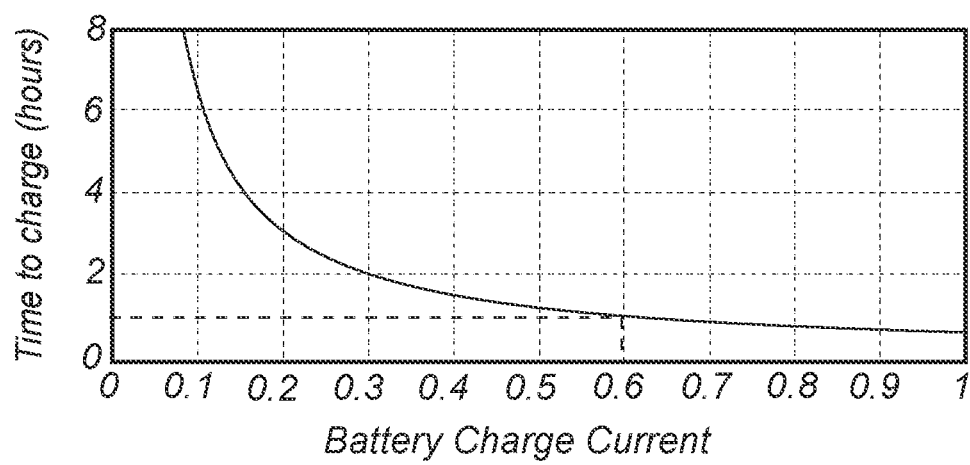

Given by way of non-limiting example and as shown in FIGS. 7A and 7B, in a first scenario a SOC charge request of 20-100 percent has been entered and a maximum charge time duration of one hour has been entered. Up to six DC power modules 28 are available for charging, and maximum charging current is limited by a charging cable.

As shown in FIG. 7A, charging efficiency is plotted along a y-axis for a number N of DC power modules 28 electrically connected in parallel versus battery charge current (normalized to maximum charging current) along an x-axis.

As shown in FIG. 7B, the charge current entailed in completing the charge in one hour is determined to be 0.6 maximum charge current (normalized).

As shown in FIG. 7A, with battery charge current at 0.6 maximum charge current (normalized), three or more DC power modules 28 electrically connected in parallel are entailed in completing the charge to the target SOC within the maximum charge time duration of one hour (that is, N is greater than or equal to 3). In this scenario and as shown in FIG. 7A, less than three DC power modules 28 (that is, one or two DC power modules 28) are not able to complete the charge to the target SOC within the maximum charge time duration of one hour.

As shown in FIG. 7A, six DC power modules 28 electrically connected in parallel result in a maximized charge efficiency and six DC power modules 28 electrically connected in parallel are selected to perform the charge. In various embodiments, the processor 16 causes the switching matrix 35 to electrically connect the six DC power modules 28 to the selected electrical power dispenser assembly 22. The processor 16 sets total charge current to 0.6 times maximum charge current and sets current per DC power module to ⅙ the total charge current. It will be appreciated that, as shown in FIG. 7A, charge efficiency in this scenario is around 94.8 percent.

Figure 7C:
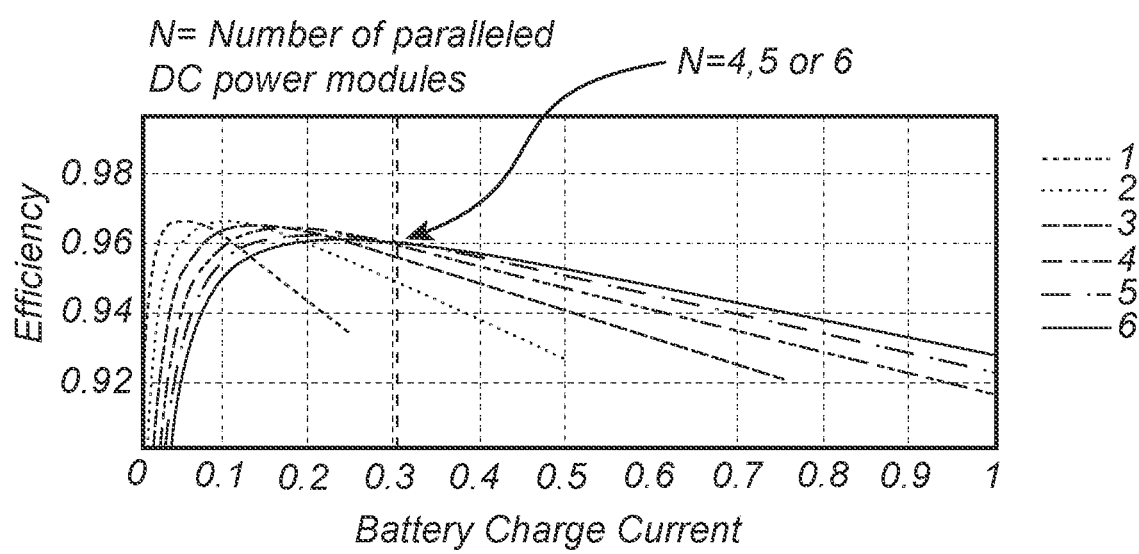
FIGS. 7C and 7D are graphs of charge efficiency versus battery charge current and time to charge versus battery charge current, respectively, for another illustrative battery charging application.
Figure 7D:
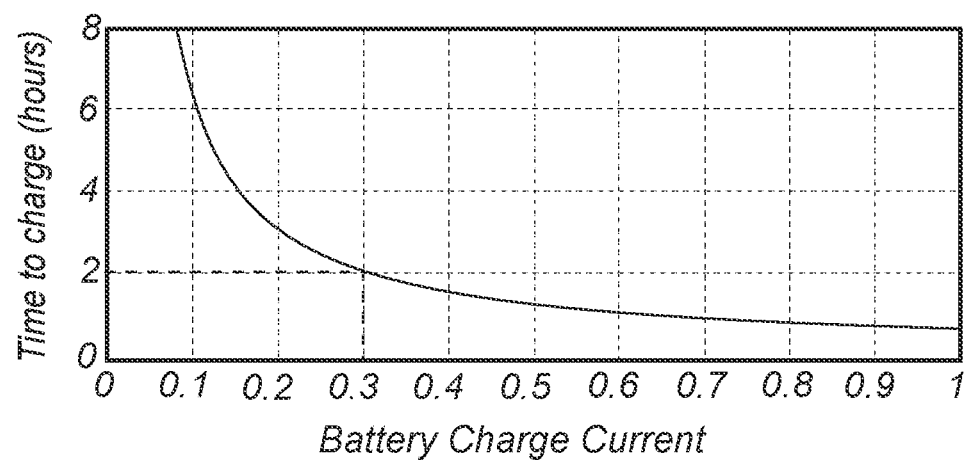

Given by way of non-limiting example and as shown in FIGS. 7C and 7D, in a second scenario a SOC charge request of 20-100 percent has been entered and a maximum charge time duration of two hours has been entered. Up to six DC power modules 28 are available for charging, and maximum charging current is limited by a charging cable.

As shown in FIG. 7C, charging efficiency is plotted along a y-axis for a number N of DC power modules 28 electrically connected in parallel versus battery charge current (normalized to maximum charging current) along an x-axis.

As shown in FIG. 7D, the charge current entailed in completing the charge in two hours is determined to be 0.3 maximum charge current (normalized).

As shown in FIG. 7C, with battery charge current at 0.3 maximum charge current (normalized), two or more DC power modules 28 electrically connected in parallel are entailed in completing the charge to the target SOC within the maximum charge time duration of two hours (that is, N is greater than or equal to 2). In this scenario and as shown in FIG. 7C, less than two DC power modules 28 (that is, one DC power module 28) is not able to complete the charge to the target SOC within the maximum charge time duration of two hours.

As shown in FIG. 7C, four or five or six DC power modules 28 electrically connected in parallel can result in about a substantially similar maximized charge efficiency and four DC power modules 28 electrically connected in parallel are selected to perform the charge. In various embodiments, the processor 16 causes the switching matrix 35 to electrically connect the four DC power modules 28 to the selected electrical power dispenser assembly 22. The processor 16 sets total charge current to 0.3 times maximum charge current and sets current per DC power module to ¼ the total charge current. It will be appreciated that, as shown in FIG. 7C, charge efficiency in this scenario is around 96 percent.

Figure 7E:
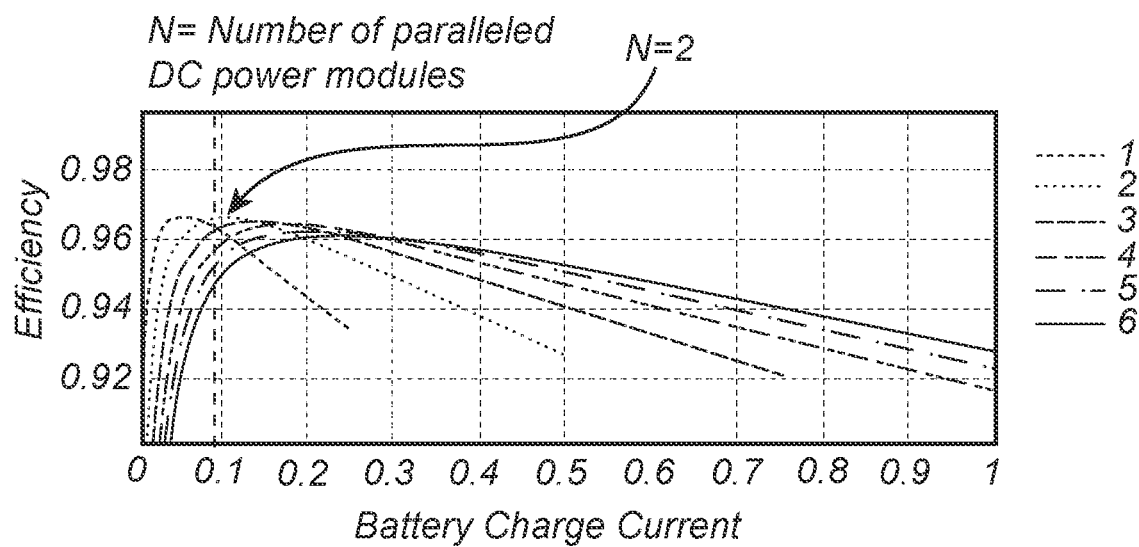
FIGS. 7E and 7F are graphs of charge efficiency versus battery charge current and time to charge versus battery charge current, respectively, for another illustrative battery charging application.
Figure 7F:
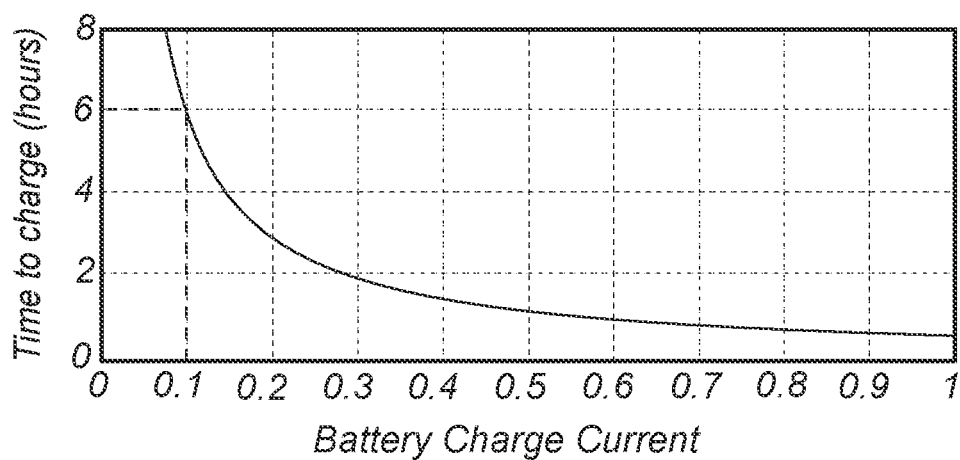

Given by way of non-limiting example and as shown in FIGS. 7E and 7F, in a third scenario a SOC charge request of 20-100 percent has been entered and a maximum charge time duration of six hours has been entered. Up to six DC power modules 28 are available for charging, and maximum charging current is limited by a charging cable.

As shown in FIG. 7E, charging efficiency is plotted along a y-axis for a number N of DC power modules 28 electrically connected in parallel versus battery charge current (normalized to maximum charging current) along an x-axis.

As shown in FIG. 7F, the charge current entailed in completing the charge in six hours is determined to be 0.1 maximum charge current (normalized).

As shown in FIG. 7E, with battery charge current at 0.1 maximum charge current (normalized), any number of the DC power modules 28 electrically connected in parallel can complete the charge to the target SOC within the maximum charge time duration of six hours (that is, N is greater than or equal to 1).

As shown in FIG. 7E, two DC power modules 28 electrically connected in parallel can result in a maximized charge efficiency and two DC power modules 28 electrically connected in parallel are selected to perform the charge. In various embodiments, the processor 16 causes the switching matrix 35 to electrically connect the two DC power modules 28 to the selected electrical power dispenser assembly 22. The processor 16 sets total charge current to 0.1 times maximum charge current and sets current per DC power module to ½ the total charge current. It will be appreciated that, as shown in FIG. 7E, charge efficiency in this scenario is around 96.5 percent.

Figure 7G:
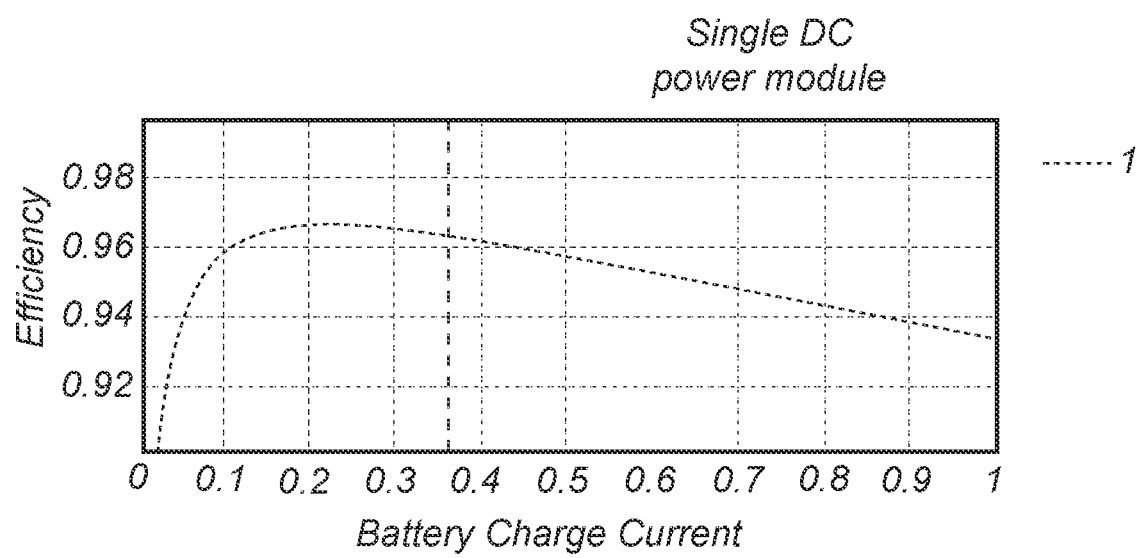
FIGS. 7G and 7H are graphs of charge efficiency versus battery charge current and time to charge versus battery charge current, respectively, for another illustrative battery charging application.
Figure 7H:
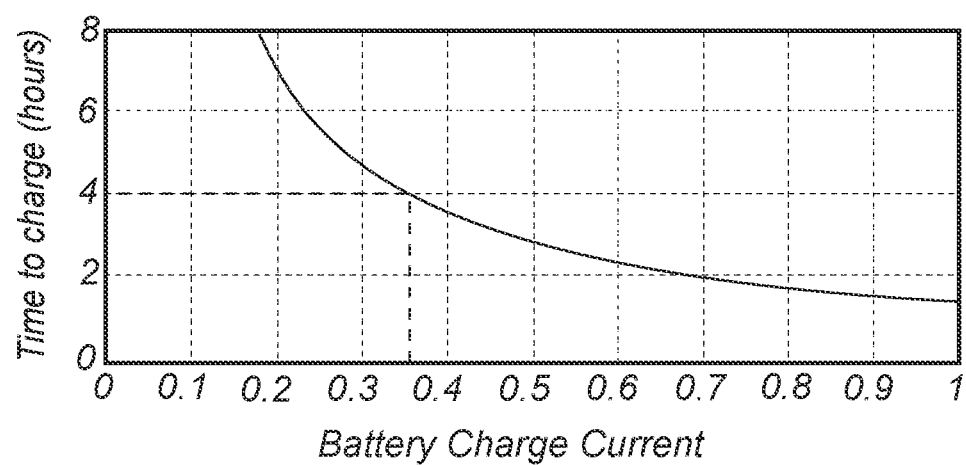

Given by way of non-limiting example and as shown in FIGS. 7G and 7H, in a fourth scenario a SOC charge request of 20-100 percent has been entered and a maximum charge time duration of four hours has been entered. Only one DC power module 28 is available for charging.

As shown in FIG. 7G, charging efficiency is plotted along a y-axis for one DC power module 28 versus battery charge current (normalized to maximum charging current) along an x-axis.

As shown in FIG. 7H, the charge current entailed in completing the charge in four hours is determined to be 0.36 maximum charge current (normalized).

As shown in FIG. 7G, with battery charge current at 0.36 maximum charge current (normalized), one of the DC power modules 28 can complete the charge to the target SOC within the maximum charge time duration of four hours.

As shown in FIG. 7G, one of the DC power modules 28 can result in a maximized charge efficiency and one of the DC power modules 28 is selected to perform the charge. In various embodiments, the processor 16 causes the switching matrix 35 to electrically connect the one selected DC power module 28 to the selected electrical power dispenser assembly 22. The processor 16 sets total charge current to 0.36 times maximum charge current and sets current per the one selected DC power module to the total charge current. It will be appreciated that, as shown in FIG. 7G, charge efficiency in this scenario is around 96.3 percent (as opposed to charging efficiency at maximum charging current, which would yield only 93.5 percent efficiency). It will be appreciated that allowing a longer charge time can help improve efficiency.

Figure 8:
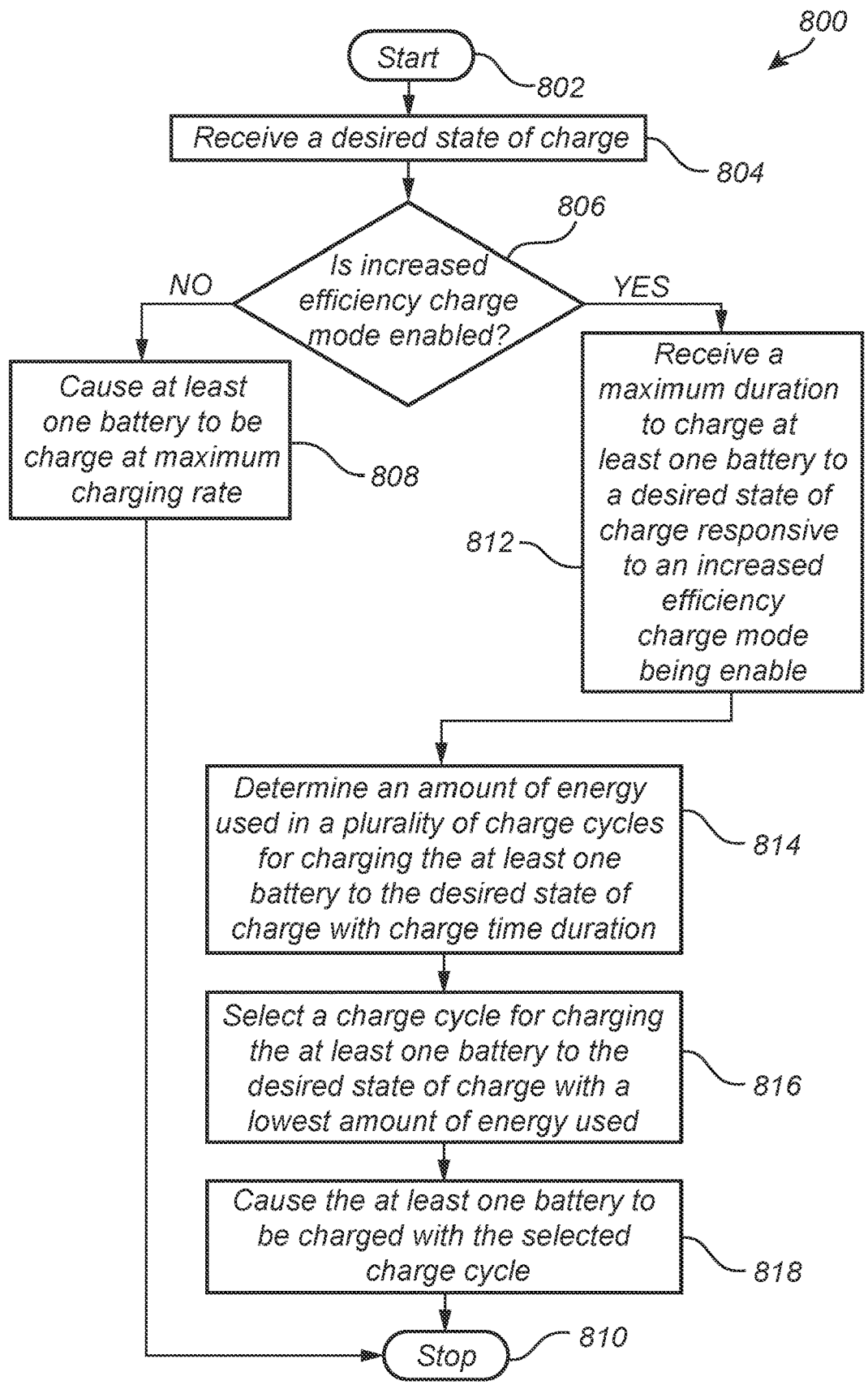
FIG. 8 is a flow chart of an illustrative method of charging a battery.

Referring additionally to FIG. 8, in various embodiments a method 800 starts at a block 802. At a block 804 a desired state of charge is received. At a block 806 a determination is made whether an increased efficiency charge mode is enabled. At a block 808, at least one battery is charged at a maximum charging rate responsive to an increased efficiency charge mode not being enabled, and the method 800 ends at a block 810. At a block 812 a maximum charge time duration to charge at least one battery to a desired state of charge is received responsive to an increased efficiency charge mode being enabled. At a block 814 an amount of energy used in a plurality of charge cycles for charging the at least one battery to the desired state of charge with charge time durations no longer than the maximum charge time duration is determined. At a block 816 a charge cycle for charging the at least one battery to the desired state of charge with a lowest amount of energy used is selected. At a block 818 the at least one battery is caused to be charged with the selected charge cycle, and the method 800 ends at a block 910.

In various embodiments selecting a charge cycle for charging the at least one battery to the desired state of charge with a lowest amount of energy used at the block 816 may include selecting a charge cycle performed using less than a maximum charge power capability of a charging system.

In various embodiments selecting a charge cycle for charging the at least one battery to the desired state of charge with a lowest amount of energy used at the block 816 may include selecting a charge cycle performed using a maximum charge power capability of a charging system.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A direct current (DC) fast charger (DCFC) controller unit comprising:
   a controller including:
     a processor; and
     computer-readable media configured to store computer-executable instructions configured to cause the processor to:
       receive a maximum charge time duration to charge at least one battery to a desired state of charge responsive to an increased efficiency charge mode being enabled;
       determine an amount of energy used in a plurality of charge cycles for charging the at least one battery to the desired state of charge with charge time durations no longer than the maximum charge time duration;

select a charge cycle for charging the at least one battery to the desired state of charge with a lowest amount of energy used; and cause the at least one battery to be charged with the selected charge cycle.

2. The controller unit of claim 1, wherein the computer-executable instructions are further configured to cause the processor to determine an amount of energy used in a plurality of charge cycles for charging the at least one battery to the desired state of charge with charge time durations no longer than the maximum charge time duration responsive to efficiency of a charging system, efficiency of the at least one battery, and maximum charge time duration.

3. The controller unit of claim 2, wherein the efficiency of a charging system is determined responsive to at least one factor chosen from electrical power conversion losses, bias and housekeeping power usage, cooling pump power usage, cooling fan power usage, controller power usage, and display power usage.

4. The controller unit of claim 2, wherein data regarding efficiency of the at least one battery is provided in a data format chosen from an efficiency curve and effective charge resistance.

5. The controller unit of claim 1, wherein the computer-executable instructions are further configured to cause the processor to operate at least one charging system cooling component chosen from a cooling pump and a cooling fan at a reduced speed.

6. The controller unit of claim 1, wherein the charge cycle selected for charging the at least one battery to the desired state of charge with a lowest amount of energy used includes a charge cycle performed using less than a maximum charge power capability of a charging system.

7. The controller unit of claim 1, wherein the charge cycle selected for charging the at least one battery to the desired state of charge with a lowest amount of energy used includes a charge cycle performed using a maximum charge power capability of a charging system.

8. A direct current (DC) fast charger (DCFC) system comprising:

an electrical power converter configured to convert alternating current (AC) electrical power to DC electrical power, the electrical power converter including a controller including:

a processor; and computer-readable media configured to store computer-executable instructions configured to cause the processor to:

receive a maximum charge time duration to charge at least one battery to a desired state of charge responsive to an increased efficiency charge mode being enabled;

determine an amount of energy used in a plurality of charge cycles for charging the at least one battery to the desired state of charge with charge time durations no longer than the maximum charge time duration;

select a charge cycle for charging the at least one battery to the desired state of charge with a lowest amount of energy used; and cause the at least one battery to be charged with the selected charge cycle; and at least one electrical power dispenser assembly electrically couplable to the electrical power converter and configured to dispense DC electrical power to at least one battery.

9. The DCFC system of claim 8, wherein the electrical power converter includes:

a plurality of DC power modules configured to convert AC electrical power to DC electrical power; and a switching matrix configured to electrically connect selected ones of the plurality of DC power modules in parallel to a selected electrical power dispenser assembly.

10. The DCFC system of claim 9, wherein the computer-executable instructions are further configured to cause the processor to determine a number of the plurality of DC power modules to electrically connect in parallel to the selected electrical power dispenser assembly.

11. The DCFC system of claim 8, wherein the computer-executable instructions are further configured to cause the processor to determine an amount of energy used in a plurality of charge cycles for charging the at least one battery to the desired state of charge with charge time durations no longer than the maximum charge time duration responsive to efficiency of a charging system, efficiency of the at least one battery, and maximum charge time duration.

12. The DCFC system of claim 11, wherein the efficiency of a charging system is determined responsive to at least one factor chosen from electrical power conversion losses, bias and housekeeping power usage, cooling pump power usage, cooling fan power usage, controller power usage, and display power usage.

13. The DCFC system of claim 12, wherein data regarding efficiency of the at least one battery is provided in a data format chosen from an efficiency curve and effective charge resistance.

14. The DCFC system of claim 8, wherein the computer-executable instructions are further configured to cause the processor to operate at least one charging system cooling component chosen from a cooling pump and a cooling fan at a reduced speed.

15. The DCFC system of claim 8, wherein the charge cycle selected for charging the at least one battery to the desired state of charge with a lowest amount of energy used includes a charge cycle performed using less than a maximum charge power capability of a charging system.

16. A method comprising:

receiving a maximum charge time duration to charge at least one battery to a desired state of charge responsive to an increased efficiency charge mode being enabled;

determining an amount of energy used in a plurality of charge cycles for charging the at least one battery to the desired state of charge with charge time durations no longer than the maximum charge time duration;

selecting a charge cycle for charging the at least one battery to the desired state of charge with a lowest amount of energy used; and causing the at least one battery to be charged with the selected charge cycle.

17. The method of claim 16, wherein determining an amount of energy used in a plurality of charge cycles for charging the at least one battery to the desired state of charge with charge time durations no longer than the maximum charge time duration includes determining an amount of energy used in a plurality of charge cycles for charging the at least one battery to the desired state of charge with charge time durations no longer than the maximum charge time duration responsive to efficiency of a charging system, efficiency of the at least one battery, and maximum charge time duration.

18. The method of claim 16, wherein selecting a charge cycle for charging the at least one battery to the desired state of charge with a lowest amount of energy used includes selecting a charge cycle performed using less than a maximum charge power capability of a charging system.

* * * * *